United States Patent
Ferrandez

(12)
(10) Patent No.: US 6,547,661 B1
(45) Date of Patent: Apr. 15, 2003

(54) MACHINE FOR REMOVING GRAPES FROM THE BUNCH BEFORE MAKING WINE

(75) Inventor: Joseph Ferrandez, Narbonne (FR)

(73) Assignee: Socma, Sarl, Narbonne (FR)

( * ) Notice: Subject to any disclaimer, the term of this patent is extended or adjusted under 35 U.S.C. 154(b) by 0 days.

(21) Appl. No.: 09/412,136

(22) Filed: Oct. 5, 1999

(30) Foreign Application Priority Data

Oct. 7, 1998 (FR) .............................................. 98 12642

(51) Int. Cl.[7] ................................................ A01F 11/08
(52) U.S. Cl. ........................ 460/144; 460/114; 460/133; 56/330
(58) Field of Search ................................ 56/328.1, 330; 460/123, 125, 126, 129, 132, 134, 140, 144, 145; 99/638, 639

(56) References Cited

U.S. PATENT DOCUMENTS

| | | | | |
|---|---|---|---|---|
| 3,194,243 A | * | 7/1965 | Cota | 460/125 |
| 4,232,506 A | * | 11/1980 | Studer | 56/328.1 |
| 4,542,687 A | * | 9/1985 | Johnson | 99/639 |
| 4,915,671 A | * | 4/1990 | Johnson | 460/59 |
| 5,613,594 A | * | 3/1997 | Kootsouradis | 198/495 |
| 5,846,129 A | * | 12/1998 | Dragt | 460/144 |
| 5,860,859 A | * | 1/1999 | Meester | 460/144 |

FOREIGN PATENT DOCUMENTS

FR      2552978 A      4/1985

OTHER PUBLICATIONS

Patent Abstracts of Japan, vol. 097, No. 003, Mar.31,1997, & JP 08 308547 A (Yamashita Hiroshi), Nov. 26, 1996.

* cited by examiner

Primary Examiner—Thomas B. Will
Assistant Examiner—Meredith C Petravick
(74) Attorney, Agent, or Firm—Young & Basile, P.C.

(57) ABSTRACT

A machine designed to remove grapes from the bunch before making wine. The machine contains a flat sieve capable of letting only the juice and the grapes pass therethrough by a toothed roller driven in axial rotation and containing separating fingers associated with the sieve and animated in relation to the sieve by a movement relative to translation in a direction parallel to the sieve allowing separation of grapes from the stalk by an ejection effect.

14 Claims, 2 Drawing Sheets

MACHINE FOR REMOVING GRAPES FROM THE BUNCH BEFORE MAKING WINE

BACKGROUND OF THE INVENTION

This invention is a machine designed to remove grapes from the bunch before making wine.

Quality research on the subject of wine production requires carrying out cleaning operations consisting of, after harvesting the grapes, lifting the stalk, leaves and other debris manually or mechanically in a manner to lead only the grapes into the wine making tank.

The present machines that allow automatic separation of grapes from the stalk are made up of a grape harvesting cleaning recovering tray which is arranged above an enclosure closed by a cover and which encloses a cylindrical metallic cage perforated and rotating around its axis. Also in the cage there is an axis coaxial to the cage supporting the separating fingers spreading radially from the axis and put into rotation in order to form a whisk or toothed roller.

The function of these machines is: the grape harvester is placed in the receiving tray serving to feed, by means of a food screw, the cage, whose rotation combined with the rotation of the toothed roller provokes the separation of grapes from the bunch. These grapes are then evacuated from the cage by passing across orifices while the other solid materials undesirable for wine making accumulate at one of the ends of the cage from which they are removed.

Sometimes in these machines small items and other debris from the leaves or stalks also pass through the orifices of the cage which lead to oenologic problems by altering the quality of the wine making material. Besides the stalks, other material must be extracted by means of complex systems increasing the cost price of the machine. Also, the grapes are frequently deteriorated by the food screw, and subjected to different shocks before being removed.

The goal of this invention is to remedy these inconveniences by proposing a machine for separating grapes before making wine from the grapes, improving the cleaning of the grape harvest and at a lower cost price compared to that of present machines.

SUMMARY OF THE INVENTION

The machine of this invention is essentially characterized by containing a flat sieve capable of only allowing grapes and juice pass through, and at least one toothed roller moving into axial rotation associated with the sieve and movable in relation to the sieve by a movement relative in translation in a direction parallel to the sieve allowing the separation of the grapes from the stalk by an ejection effect.

In the preferred method of production for this invention, the sieve is continuous and is tight between the guiding rollers. The active part of the sieve is designed to receive the grape harvest. In order to clean the grape harvest, the active part of the sieve is horizontal or inclined and the toothed roller is arranged transversally in the direction of advancing the active part and situated at a determined distance from the active part.

According to an additional characteristic of the invention, the separating fingers of the toothed roller are made of a material possessing a certain elasticity.

According to another characteristic of the invention, the separating fingers are likely to come into contact with the mobile part of the sieve or near to it.

The continuous sieve of the invention can be made from a perforated sieve or from an assembly of links, so that the openings of the sieve or the links are of dimensions slightly larger than the grapes.

According to another characteristic of the invention, the sieve is spread between two upper rollers forming the active part and two lower rollers forming the returning part.

According to an additional characteristic of the invention, the returning part of the sieve passes into a tray containing a cleaning product for the sieve which may contain an aseptic product.

According to an additional characteristic of the invention, the separating fingers are bent at their ends in the direction of rotation of the toothed brush.

BRIEF DESCRIPTION OF THE DRAWING

The advantages and characteristics of this invention will present themselves more clearly in the following description which relates to the attached drawing in which.

DESCRIPTION OF THE PREFERRED EMBODIMENTS

Figure 1:
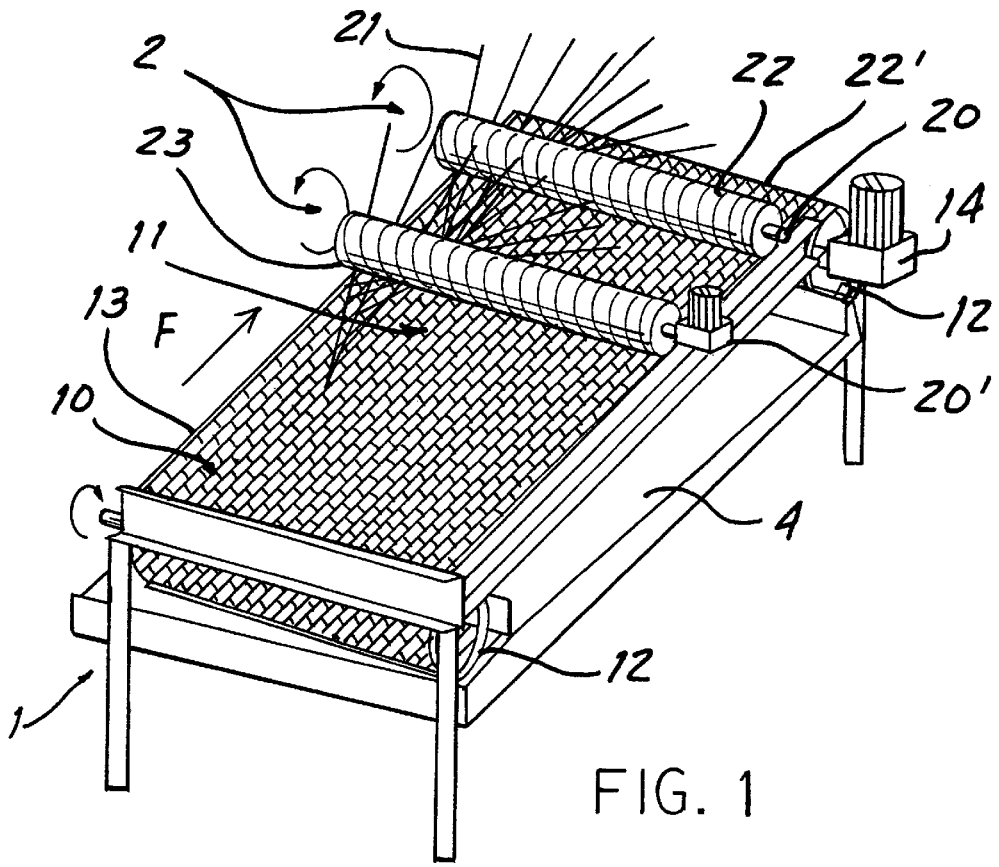
FIG. 1 represents a perspective view of the machine according to the invention in a preferred method of realization.
Figure 2:
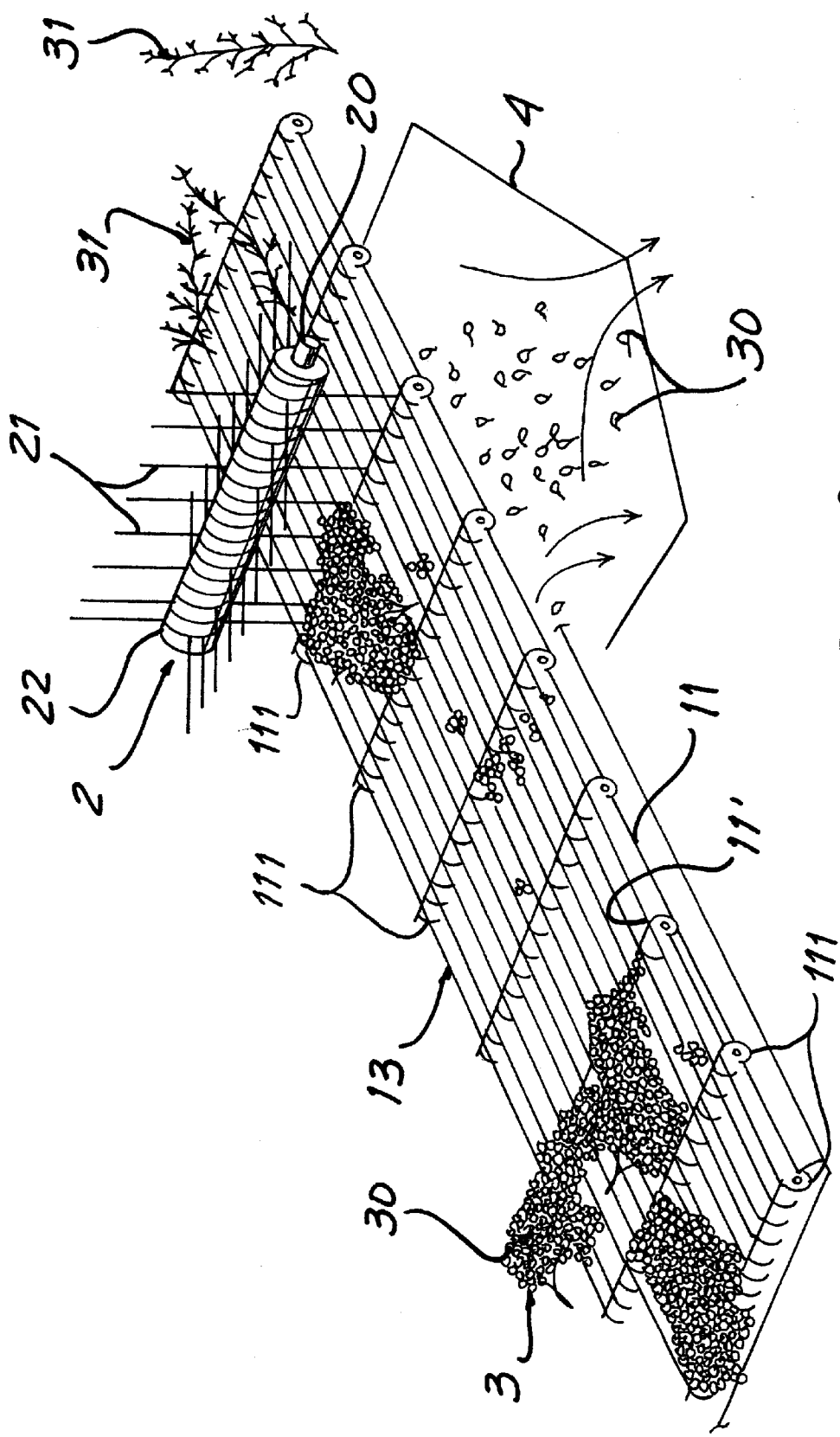
FIG. 2 represents a detailed view of the functioning sieve and a toothed roller.

If one now refers to FIGS. 1 and 2, one can see that a machine according to the invention is made up of a frame 1 supporting a flat, continuous sieve 10, created by an assembly of links 11, preferably created in a plastic material, and spread by means of rollers 12 in order to frame an active horizontal part 13 designed to receive the grape harvest 3 to be cleaned, and a driving motor 14 rotating a roller 12 assuring the displacement in translation of the sieve 10. One can also see two toothed rollers 2, of which only one is represented in FIG. 2, the axis 20 carrying the radial separating fingers 21 is arranged above the sieve 10, transverse to the direction F of its untwisting and is driven in rotation by means of a motor 20', only one of which is represented in FIG. 1. Also, one can see that one roller 22 of the two toothed rollers 2 is situated not far from the lower end 22' of the machine, while the other roller 23 is situated above the central part of the active part 13.

The dimensions of the links 11' of the sieve 10 are determined so that only the grapes 30 can pass through the sieve 10, as one can see in FIG. 2. The grapes 30 that pass through the active part 13 of the sieve 10 are retrieved, as well as the grape juice, not represented, in a recovery tray 4.

Figure 3:
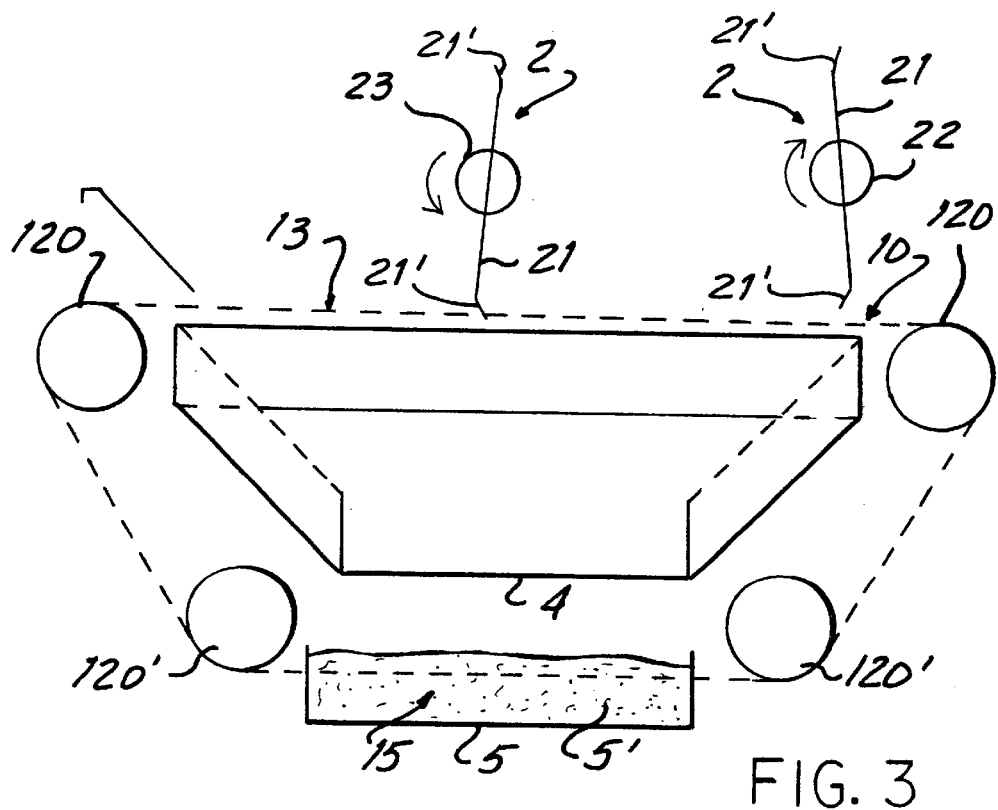
FIG. 3 represents a longitudinally cut schematic view of the machine in FIG. 1.

In FIG. 3, one can see that the sieve 10 is spread between two upper rollers 120 framing the active returning part 15 passing under the tray 4, and into a rinsing tray 5, which can contain an aseptic product 5', for the cleaning of the sieve 10.

The spreading fingers 21 of the toothed rollers 2 are preferably made of a material containing a certain elasticity and are capable of coming into contact with the upper surface of the active part 13 of the sieve 10. Therefore, in the course of their rotation, the fingers 21 come into contact with the active part 13 of the sieve 10 bringing with them the stalks 31 of the grape clusters 32 still intact, which has as an effect that the stalks 31 leave the surface of the sieve 10, to generate, thanks to their elasticity, a projection of the stalk 31 towards the lower part or the upper part of the machine, following the direction of the rotation of a toothed roller 2. By the power of this projection and the inertia of the grapes 30, the grapes 30 detach from the stalk 31 and pass across the sieve 10 through the links 11 and fall, by gravity, into the receiving tray 4. In order to optimize the work of the fingers 21, the ends 21' of the fingers 21 are bent in the direction of rotation of the roller.

As can be seen in FIG. 2, the assembly of links 11' are formed by a plurality of parallel links 11 having opposing ends each connected to another link 11 at an axis 111. Each axis 111 defines a prominence 111 which protrudes with respect to the plane of the sieve for cooperating with the fingers 21 for projecting the stalks 31.

One can also see that the central roller 22 turns in the opposite direction of the sieve 10 while the other roller 23 turns in same direction as the sieve 10.

One will note that the rollers 2 can also be positioned such that the ends of the fingers 21 do not come into contact with the sieve 10. In this case the difference in the displacement speed between the sieve and the ends of the fingers 21 will be determined in order to assure an efficient separation.

The undesirable herbaceous material, being able to pass across the links 11, rests on the sieve 10 until it arrives at a lower end where it is removed by gravity or by any other means allowing the ejection of this material, such as by an aspirator.

The displacement speed of the ends 21' of the separation fingers 21 will be, preferably, greater than the speed of displacement of the sieve 10.

In addition, the rollers can be equipped with the means of regulating their position in relation to the active part 13 of the sieve 10.

The length of the active part 13 can be defined in order to have sufficient length so that the upper part receiving the grape harvest can be transformed into a sorting table.

Finally, the machine can be constructed to adapt onto a harvesting machine so that it can process the material before its arrival in the trays of the harvesting machine.

What is claimed is:

1. A machine designed to receive a grape harvest including grapes and associated grape stalks and to separate the grapes from the associated stalks before making wine the machine comprising: a conveyor having a predetermined linear path for carrying the grape harvest, the conveyor including a continuous sieve capable of allowing only the juice and grapes to pass therethrough; and a first and second toothed roller extending over the linear path of the conveyor and driven in axial rotation and containing separating fingers associated with the sieve, said fingers made from a material having elasticity and movable relative to the sieve in a direction parallel to the sieve allowing separation of the grapes from the associated grape stalks by an ejection effect, said fingers having free end portions bent in the direction of rotation of the respective roller for projecting the rape stalks, wherein each of said first and second toothed rollers are positioned a predetermined distance above the sieve.

2. The machine according to claim 1 characterized by the separating fingers of the toothed roller being formed of an elastic material.

3. The machine according to claim 1 characterized by the separating fingers being pliable at ends in the direction of rotation of the roller.

4. The machine according to claim 1 characterized by the sieve being continuous and spread between guiding rollers, said sieve having an active part, designed to receive the grape harvest, wherein said active part has one of a horizontal or inclined orientation, and the first toothed roller is arranged transversally in the direction of advancing of the active part and situated at a determined distance above the active part.

5. The machine according to claim 4 characterized by the separating fingers being capable of coming into contact with the active part of the sieve.

6. The machine according to claim 4 characterized by the continuous sieve being made from an assembly of links, formed by a plurality of parallel links having opposing ends each connected to another link at an axis, each axis provided with a prominence protruding with respect to the plane of the sieve for cooperating with said fingers for projecting said stalks, orifices between the parallel links being of dimensions slightly larger than those of the grapes.

7. The machine according to claim 4 characterized by the sieve being spread first, between two upper rollers framing the active part and, second, between two lower rollers framing a return part which passes into a rinsing tray containing a cleaning product.

8. The machine according to claim 7 characterized by a receiving tray for receiving the grapes, wherein said receiving tray is positioned below the active part of the sieve and above the rinsing tray.

9. The machine according to claim 4 wherein the second toothed roller rotates in an opposite direction than the first toothed roller, wherein said second toothed roller is situated a determined distance above the active part.

10. The machine according to claim 4 wherein one of the toothed rollers is positioned adjacent to one end of the active part of the sieve.

11. A machine designed to receive a grape harvest including grapes and associated grape stalks and to separate the grape from the associated stalks, the machine comprising:

a conveyor moving along a path around support rollers at a predetermined speed, said path including a planar path for carrying the grape harvest, wherein all the support rollers are located below the planar path carrying the grape harvest, the conveyor including a continuous sieve capable of allowing only the grapes and associated juice therethrough and;

at least one roller extending over the planar path and rotating at another predetermined speed, said roller having fingers extending therefrom, said fingers having bent free end portions contacting the sieve, wherein said fingers separate the grapes from the grape stalks and said bent free end portions project the grape stalks allowing said grapes to pass through the sieve.

12. The machine of claim 11 wherein said sieve is formed by an assembly of links and said assembly of links is formed by a plurality of links connected to each other at raised ends forming prominences relative to the planar path, wherein said fingers interact with said prominence to project the grape stalks from the grapes.

13. The machine of claim 12 wherein said conveyor moves in an opposite direction than the direction of the fingers.

14. The machine of claim 13, wherein the predetermined speed of the roller having fingers is greater than the speed of the conveyor.

* * * * *